United States Patent [19]

Ukyo et al.

[11] Patent Number: 5,081,079
[45] Date of Patent: Jan. 14, 1992

[54] SINTERED BODY OF SILICON NITRIDE AND A PROCESS FOR MAKING THE SAME

[75] Inventors: Yoshio Ukyo; Shigetaka Wada, both of Aichi, Japan

[73] Assignee: Kabushiki Kaisha Toyota Chuo Kenkyusho, Aichi, Japan

[21] Appl. No.: 568,875

[22] Filed: Aug. 17, 1990

[30] Foreign Application Priority Data

Aug. 25, 1989 [JP] Japan .................................. 1-219543

[51] Int. Cl.$^5$ .............................................. C04B 35/58
[52] U.S. Cl. .......................................... 501/97; 501/98; 428/698; 428/702; 264/60
[58] Field of Search .................... 501/97, 98; 428/698, 428/702; 264/60

[56] References Cited

U.S. PATENT DOCUMENTS

| | | | |
|---|---|---|---|
| 4,312,899 | 1/1982 | Lahmann | 428/698 X |
| 4,622,186 | 11/1986 | Mizutani | 428/698 X |
| 4,880,755 | 11/1989 | Mehrotra et al. | 501/97 X |
| 4,943,543 | 7/1990 | Ingelstrom | 501/98 X |

Primary Examiner—Karl Group
Attorney, Agent, or Firm—Oblon, Spivak, McClelland, Maier & Neustadt

[57] ABSTRACT

A sintered body composed of $\alpha'$-silicon nitride and $\beta'$-silicon nitride, and having a surface portion which contains a greater proportion of $\alpha'$-silicon nitride than its inner portion does. It has high strength and excellent wear resistance. It is produced by preparing a molded body from a sintering material, disposing about the molded body a sintering material which can form a sintered product containing a greater proportion of $\alpha'$-silicon nitride than the sintered product of the molded body will, and sintering the molded body and the material disposed about it.

17 Claims, 2 Drawing Sheets

1 μm    (x 20000)

1 μm    (x 20000)

SINTERED BODY OF SILICON NITRIDE AND A PROCESS FOR MAKING THE SAME

BACKGROUND OF THE INVENTION

1. Field of the Invention

This invention relates to a sintered body composed of $\alpha'$-silicon nitride and $\beta'$-silicon nitride, and having high strength and high resistance to wear, such as erosive wear, and a process for making the same.

2. Description of the Prior Art

A sintered body of silicon nitride ($Si_3N_4$) has come to be used for making gas turbine parts, heat exchangers, bearings, etc. because of its high strength, thermal shock resistance, and corrosion resistance. A rapidly rotating body, such as a gas turbine blade, is, however, worn by, for example, dust floating in the air. For example, a plant using coal is seriously worn by the dust of coal. A sintered body of $Si_3N_4$ has also come to be used for making tools for cutting heat-resisting alloys, or other tools required to have a high level of wear resistance. A known sintered body consisting mainly of $\beta\text{-}Si_3N_4$ is, however, too low in hardness to exhibit a high degree of wear resistance. It is known that a high degree of hardness is a highly desirable factor for any material to be able to exhibit excellent resistance to erosion and other wear.

Silicon nitrides of the type in which various elements form solid solutions, which are generally known as sialons, have come to draw attention because of their high hardness. One example is $\alpha'\text{-}Si_3N_4$ (or $\alpha$-sialon) which occurs when Al replaces Si, while O replaces N, in the crystal lattice of $\alpha\text{-}Si_3N_4$, and another element, such as Li, Mg, Ca or Y, occupies the interstices of the lattice. It is represented by the general formula:

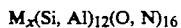

$$M_x(Si, Al)_{12}(O, N)_{16}$$

where M is at least one of such elements as Li, Mg, Ca and Y, and $0 < x \leq 2$. Another example is $\beta'\text{-}Si_3N_4$ (or $\beta$-sialon) which is formed by the replacement of Si by Al, and of N by O, in the crystal lattice of $\beta\text{-}Si_3N_4$, and which is represented by the general formula:

$$Si_{6-z}Al_zO_zN_{8-z}$$

where $0 < z \leq 4.2$.

Although $\alpha'\text{-}Si_3N_4$ is superior to $\beta'\text{-}Si_3N_4$ in hardness and wear resistance, it is inferior in toughness and strength. Therefore, a sintered body composed of $\alpha'\text{-}Si_3N_4$, $\beta'\text{-}Si_3N_4$ and a bonding phase has been developed to provide a material which is excellent in both wear resistance and strength, as disclosed in Japanese Patent Publications Nos. 8074/1988 and 8075/1988. This material is, however, still unsatisfactory in strength, as it contains a relatively large amount of bonding phase.

SUMMARY OF THE INVENTION

Under these circumstances, it is an object of this invention to provide a sintered body of silicon nitride having high strength, as well as excellent wear resistance.

It is another object of this invention to provide a process which can make a sintered body of silicon nitride having high strength, as well as excellent wear resistance.

The sintered body of this invention is composed of $\alpha'$-silicon nitride and $\beta'$-silicon nitride, and contains a greater proportion of $\alpha'$-silicon nitride in its surface portion than in its inner portion. It has high strength and excellent resistance to wear, particularly erosive wear. Its wear resistance is due to the presence of a greater proportion of hard $\alpha'$-silicon nitride in its surface portion, and also to the fact that its surface portion is composed of the same type of crystal phase as its inner portion and is, therefore, very unlikely to peel off. Its strength is manifested by its inner portion which is composed of $\alpha'$-silicon nitride and $\beta'$-silicon nitride.

The process of this invention comprises the first step of preparing a molded body of a material which can form a sintered body composed of $\alpha'$-silicon nitride and $\beta'$-silicon nitride, and the second step of disposing about the molded body a material which can form a sintered body composed of $\alpha'$-silicon nitride and $\beta'$-silicon nitride, but containing a greater proportion of $\alpha'$-silicon nitride than the sintered product of the molded body will, and sintering the molded body and the material disposed about it.

The process of this invention can make a sintered body of silicon nitrides having high strength and excellent wear resistance. As the material disposed about the molded body is sintered with it, it forms a surface layer which does not readily peel off or crack, as opposed to a surface layer formed by coating a sintered body.

These and other objects, features and advantages of this invention will become more apparent from the following description and the accompanying drawings.

DETAILED DESCRIPTION OF THE INVENTION

Figure 1:
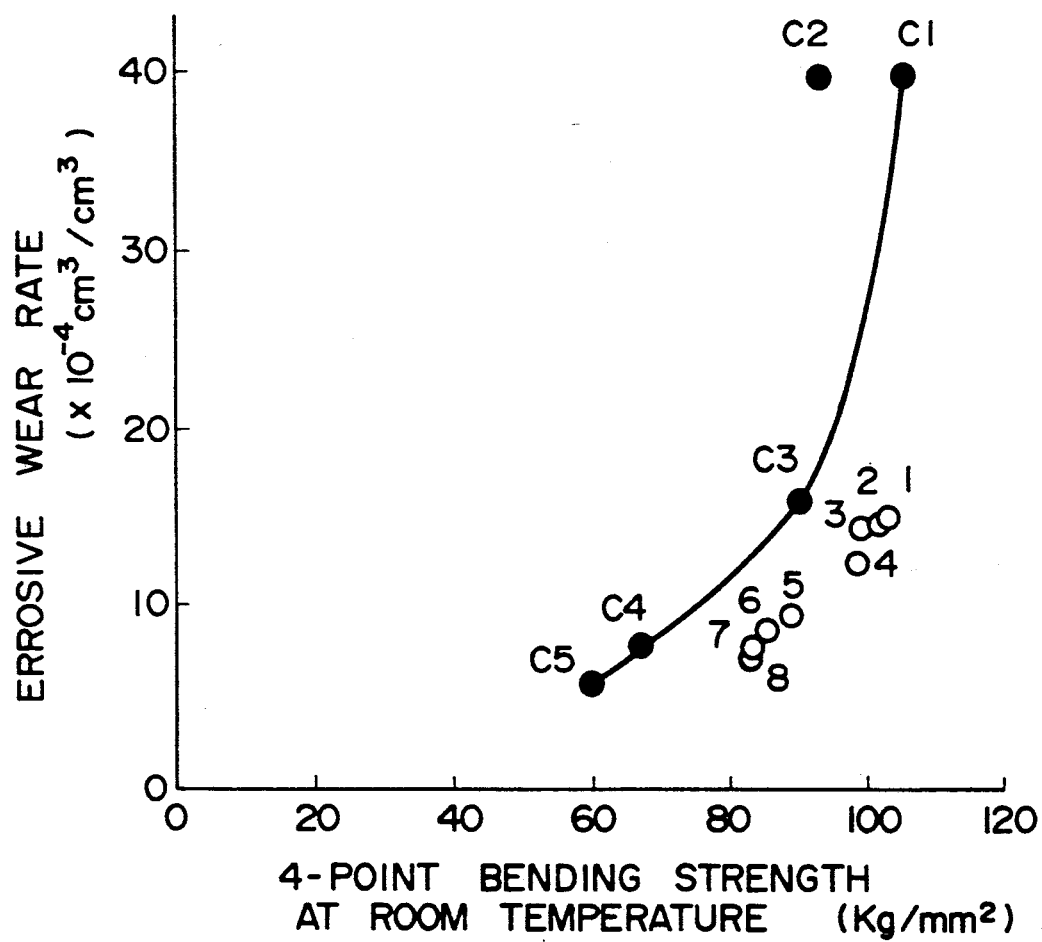
FIG. 1 is a graph showing the four-point bending strength at room temperature and erosive wear of sintered bodies obtained in the Examples as will hereinafter be described.

The sintered body of this invention is composed of $\alpha'$-silicon nitride and $\beta'$-silicon nitride, and contains a greater proportion of $\alpha'$-silicon nitride in its surface portion than in its inner portion. Its surface portion may even be free of any $\beta'$-silicon nitride.

$\alpha'$-silicon nitride ($\alpha'\text{-}Si_3N_4$) is a compound which occurs when Al replaces Si, while O replaces N, in the crystal lattice of $\alpha Si_3N_4$, and at least one of other elements, such as lithium (Li), magnesium (Mg), calcium (Ca) and yttrium (Y), occupies the interstices of the lattice. It has the general formula $M_x(Si, Al)_{12}(O, N)_{16}$, where M is at least one of such elements as Li, Mg, Ca and Y, and $0 < x \leq 2$, and is generally called $\alpha$-sialon.

$\beta'$-silicon nitride ($\beta'\text{-}Si_3N_4$) is a compound which is formed by the replacement of Si by Al, and of N by O, in the crystal lattice of $\beta\text{-}Si_3N_4$. It has the general formula $Si_{6-z}Al_zO_zN_{8-z}$, where $0 < z \leq 4.2$, and is generally called $\beta$-sialon.

Preferred compositions for the silicon nitrides are obtained when $0 < x \leq 0.3$, and $0 < z < 1.0$, respectively.

The preferred proportions of the silicon nitrides in the sintered body are such that in its inner portion, $\alpha'\text{-}Si_3N_4$ has a value of 0.05 to 0.50, while $\beta'\text{-}Si3N4$ has a value of 0.50 to 0.95, as expressed by the ratio of their peak strength revealed by X-ray diffraction, and such that $\alpha'$-Si$_3$N$_4$ has a proportion which is higher by a value of 0.05 to 0.2 in the surface portion of the sintered body than in its inner portion. A sintered body containing higher proportion of $\alpha'$-Si$_3$N$_4$ in its surface portion has an undesirably lower strength, while no sintered body containing a lower proportion thereof in its surface portion is expected to exhibit any improved wear resistance.

The values as hereinabove used to define the proportions of the silicon nitrides are obtained by making the sum of the highest and the second highest peak strength revealed by the X-ray diffraction of each compound, and comparing the sums obtained for the two compounds.

The greater proportion of $\alpha'$-Si$_3$N$_4$ in the surface portion of the sintered body than in its inner portion may be achieved by providing separate surface and inner portions having different proportions of the silicon nitride (i.e., forming a separate surface layer), or by preparing a single mass having a proportion of the nitride varying continuously from its interior to its surface. It is alternatively possible to prepare a body composed of an inner portion, a surface layer and at least one intermediate layer disposed between the inner portion and the surface layer and having a nitride proportion lying between the proportions of the nitride in the inner portion and the surface layer. When a surface layer is formed, it is recommended that its thickness including that of the intermediate layer or layers, if any, be approximately in the range of 200 to 500 microns.

It is preferable to use $\alpha'$-Si$_3$N$_4$ composed of spherical crystal grains having an average diameter not exceeding 2.0 microns, and more preferably not exceeding 1.0 micron. It is also preferable to use $\beta'$-Si$_3$N$_4$ composed of elliptically spherical crystal grains having an average long diameter not exceeding 5.0 microns, and more preferably not exceeding 2.5 microns, and an average short diameter not exceeding 1.0 micron, and more preferably not exceeding 0.5 micron. The grains having these ranges of diameters are so fine as to ensure the manufacture of a sintered product having a very large internal defect and therefore a greatly improved strength.

The sintered product of this invention may contain as a third component any of various heat-resisting substances, such as oxides, nitrides, carbides, silicides, borides and sulfides, depending on the purpose for which the sintered product is intended. Moreover, any sintering assistant used in the sintering process may remain in the sintered product.

The sintered body of this invention may also have a surface layer formed by, for example, coating the surface of its inner portion with an appropriate material.

The excellent properties of the sintered product according to this invention as hereinabove described make it very useful as a material for machine parts exposed to high temperatures, parts of a chemical plant, bearings and other mechanical parts required to have a high level of wear resistance, parts of a gas turbine, a heat exchanger, etc.

The process of this invention comprises the first step of preparing a molded body of a material which can form a sintered body composed of $\alpha'$-Si$_3$N$_4$ and $\beta'$-Si$_3$N$_4$, and the second step of disposing about the molded body a material which can form a sintered body composed of $\alpha'$-Si$_3$N$_4$ and $\beta'$-Si$_3$N$_4$, but containing a greater proportion of $\alpha'$-Si$_3$N$_4$ than the sintered product of the molded body will, and sintering the molded body and the material disposed about it. The material used in the second step forms the surface portion of the product of the process.

The material used for preparing a molded body in the first step of the process consists of a material which can form $\alpha'$-Si$_3$N$_4$ when heated for sintering, and a material which can form $\beta'$-Si$_3$N$_4$ when heated. The same may be true with the material used in the second step.

The material which can form $\alpha'$-Si$_3$N$_4$ when heated is one which can form $\alpha'$-Si$_3$N$_4$ in the sintered product. It may consist of $\alpha'$-Si$_3$N$_4$ itself, or a mixture of substances which react together at a sintering temperature to form $\alpha'$-Si$_3$N$_4$, or both. Examples of the mixture of substances which react together to form $\alpha'$-Si$_3$N$_4$ are the mixtures of Si$_3$N$_4$, AlN and Y$_2$O$_3$; Si$_3$N$_4$, AlN, Al$_2$O$_3$ and Y$_2$O$_3$; and Si$_3$N$_4$, Al$_2$O$_3$, Y$_2$O$_3$ and YN. All of these are the mixtures which can be used to form $\alpha'$-Si$_3$N$_4$ containing yttrium in a solid solution.

The material which can form $\beta'$-Si$_3$N$_4$ when heated is one which can form $\beta'$-Si$_3$N$_4$ in the sintered product. It may consist of $\beta'$-Si$_3$N$_4$ itself, or a mixture of substances which react together at a sintering temperature to form $\beta'$-Si$_3$N$_4$, or both. Examples of the mixture of substances which react together to form $\beta'$-Si$_3$N$_4$ are the mixtures of Si$_3$N$_4$ and Al$_2$O$_3$; Si$_3$N$_4$, AlN and Al$_2$O$_3$; and Si$_3$N$_4$, Al$_2$O$_3$ and SiO$_2$.

A mixture of substances which can be used to form $\alpha'$-Si$_3$N$_4$ as a reaction product when heated can be used to form not only $\alpha'$-Si$_3$N$_4$, but simultaneously $\beta'$-Si$_3$N$_4$ as well, if the proportions of the substances in the mixture are appropriately controlled. For example, $\alpha'$-Si$_3$N$_4$ containing yttrium in a solid solution and $\beta'$-Si$_3$N$_4$ can be formed simultaneously if the proportions of Y$_2$O$_3$ and AlN, or Y$_2$O$_3$, AlN and Al$_2$O$_3$, or YN and Al$_2$O$_3$, relative to Si$_3$N$_4$ are appropriately controlled, as $\alpha'$-Si$_3$N$_4$ is formed by the solution of Y, Al and O in Si$_3$N$_4$, and $\beta'$-Si$_3$N$_4$ by the solution of Al and O. A mixture having one and the same composition can be used to produce sintered bodies containing different proportions of $\alpha'$-Si$_3$N$_4$ and $\beta'$-Si$_3$N$_4$ if the sintering temperature and time are appropriately altered.

It is possible to obtain a sintered body comprising $\alpha'$-Si$_3$N$_4$ and $\beta'$-Si$_3$N$_4$ each having two or more different compositions, which occur when each of x and z in the general formulas as hereinabove given represents two or more different values. This is possible by employing a powder having a wide particle size distribution as each of the materials for forming $\alpha'$- and $\beta'$-Si$_3$N$_4$, respectively, when heated, or by using two or more powders of each of $\alpha'$- and $\beta'$-Si$_3$N$_4$ having different compositions.

When the material of a sintered body of Si$_3$N$_4$ is composed of a powder of Si$_3$N$_4$ and sintering agent, it is preferable to use the powder of Si$_3$N$_4$ in which the total amount of oxygen is at most 2 weight % and the amount of oxygen which exists as silicon oxide in the surface portion thereof is not less than 40% of the total amount of oxygen. This will prevent the excessive growth of crystal grains of Si$_3$N$_4$, thereby providing very fine crystal grains. As a result, the sintered body of Si$_3$N$_4$ with high strength can be achieved.

The above-mentioned material of a sintered body of Si$_3$N$_4$ is used as a material for forming an inner and/or a surface portion of the sintered body.

In the first step of the process, the molded body can be prepared by any of a variety of known methods, such as pressing in a metal or rubber mold, extrusion, slip casting and injection molding.

In the second step of the process, the material as hereinabove described is disposed about the molded body which has been prepared in the first step (hereinafter referred to as the inner body), and the whole is sintered. The material used in the second step is of such composition that a sintered product thereof may contain a greater proportion of $\alpha'$-$Si_3N_4$ than a sintered product of the inner body. The material can also be of such composition that a sintered product thereof consists solely of $\alpha'$-$Si_3N_4$.

The material can be disposed about the inner body if it is caused to adhere to the surface of the inner body, or if the inner body is embedded in the powder of the material. Dipping in a slip, spraying, or electrical deposition can, for example, be employed for causing the material to adhere to the surface of the inner body.

A plurality of powders having different compositions can be disposed in one layer upon another on the inner body to produce a sintered body having a proportion of $\alpha'$-$Si_3N_4$ varying continuously or in steps from its interior to its surface.

Either pressure or pressureless sintering may be employed. More specifically, normal, or gas pressure sintering, or hot isostatic press (HIP) sintering can, for example, be employed. The sintering is preferably carried out in an inert gas atmosphere, such as nitrogen or argon gas, or in a nonoxidizing atmosphere, as in a vacuum. A sintering temperature of 1650° C. to 1900° C. is recommended. The use of any temperature lower than 1650° C. results in a product which has not satisfactorily been densified, while the excessive growth of grains occurs at any temperature over 1900° C. In either event, the sintered product fails to exhibit a satisfactorily high strength.

It is possible to achieve the intended proportions, crystal grain sizes and compositions of the two types of silicon nitrides in the sintered body if the mixing ratio of the materials for forming the silicon nitrides when heated, and the sintering conditions are appropriately altered.

The invention will now be described more specifically with reference to several examples and comparative examples.

EXAMPLE 1

A powder of $Si_3N_4$ having an alpha ratio of at least 5% and, an average particle diameter of 1.0 micron was mixed with 2 to 7% by weight of a powder of AlN having an average particle diameter of 0.5 micron and 1.5 to 5% by weight of a powder of $Y_2O_3$ having an average particle diameter of 0.8 micron. The mixture was molded in a metal press into a body measuring 4 mm by 6 mm by 45 mm and an isostatic pressure of 3000 kg/cm$^2$ was applied to the molded product. The molded body was embedded in a powder of $Si_3N_4$ containing a greater proportion of AlN and $Y_2O_3$ than the molded body did, or in a powder of $\alpha'$-$Si_3N_4$. The whole was sintered at a temperature of 1650° C. to 1900° C. and normal pressure for 0.5 to 10 hours in a nitrogen gas atmosphere.

The sintered product was analyzed by X-ray diffraction for the proportions of $\alpha'$- and $\beta'$-$Si_3N_4$ of which it was composed. The analysis was first made of its surface. Then, a layer having a thickness of several tens of microns was removed by grinding from its surface and the exposed surface was likewise analyzed. This process of grinding and analysis was repeated several times. In any event, the proportions of the two types of silicon nitrides were determined by comparing the sum of the two highest peak strength values marked by one type of silicon nitride in a chart obtained by the X-ray diffraction of the sintered product and the sum of the two highest peak strength values marked by the other type of silicon nitride.

The process of sintering and analysis as hereinabove described was repeated for preparing eight samples of sintered products embodying this invention and determining the proportions of the two types of silicon nitrides in each product. The samples are shown as Samples Nos. 1 to 8 in Table 1 below, in which the results of the analysis are also shown. Each value showing the proportion of $Si_3N_4$ in Table 1 is that which occurs when the values showing the proportions of the two types of silicon nitrides make a total of 1. In Table 1, the surface portion means a portion from the surface of a sintered product to a depth of 200 to 300 microns below it. As is obvious from Table 1, every sample according to this invention was found to contain a greater proportion of $\alpha'$-$Si_3N_4$ in its surface portion than in its inner portion.

Comparative samples, which are shown as C1 to C5, in Table 1, were prepared by following the process which had been employed for preparing the samples of this invention, except that each molded body was embedded in the same powder as that from which it had been molded. The analysis was also repeated and the results are shown in Table 1. Four of the comparative samples were found to contain equal proportions of $\alpha'$-$Si_3N_4$ in the surface and inner portions thereof. The remaining sample, C2, was found to contain even a greater proportion of $\alpha'$-$Si_3N_4$ in its inner portion than in its surface portion.

TABLE 1

| Sample No. | | Proportion of $\alpha$-$Si_3N_4$ | | Four-point bending strength at room temp. (kg/mm$^2$) | Erosive wear ($\times 10^{-4}$cm$^3$/cm$^3$) |
|---|---|---|---|---|---|
| | | Surface portion | Inner portion | | |
| Invention | 1 | 0.17 | 0.11 | 103 | 15.2 |
| | 2 | 0.19 | 0.11 | 102 | 14.9 |
| | 3 | 0.20 | 0.12 | 98 | 14.8 |
| | 4 | 0.25 | 0.11 | 98 | 12.2 |
| Comparative | C1 | 0.11 | 0.11 | 105 | 41.5 |
| Invention | 5 | 0.29 | 0.23 | 88 | 9.8 |
| | 6 | 0.33 | 0.24 | 85 | 8.7 |
| | 7 | 0.35 | 0.23 | 83 | 8.0 |
| | 8 | 0.38 | 0.23 | 83 | 7.5 |
| Comparative | C2 | 0.11 | 0.23 | 93 | 40.0 |
| | C3 | 0.23 | 0.23 | 89 | 15.0 |
| | C4 | 0.50 | 0.50 | 67 | 8.0 |

TABLE 1-continued

| Sample No. | Proportion of $\alpha$-Si$_3$N$_4$ | | Four-point bending strength at room temp. (kg/mm$^2$) | Erosive wear ($\times 10^{-4}$cm$^3$/cm$^3$) |
| --- | --- | --- | --- | --- |
| | Surface portion | Inner portion | | |
| C5 | 0.60 | 0.60 | 60 | 6.0 |

Each sample was examined for four-point bending strength at room temperature after a layer having a thickness of about 100 microns had been removed by grinding from its surface. It was also tested for erosive wear with a SiC abrasive powder having an average particle size of 500 microns. The abrasive powder was caused to fly at a speed of 250 to 300 meters per second and strike against the sample surface at an angle of 80° thereto. The results of the bending and wear tests are shown in Table 1 and also in FIG. 1. The numbers appearing in FIG. 1 correspond to those of the samples which appear in Table 1. The solid line in FIG. 1 was obtained by connecting the test results given by the comparative samples each containing an equal proportion of $\alpha'$-Si$_3$N$_4$ in its surface and inner portions.

As is obvious from Table 1 and FIG. 1, the samples according to this invention were, as a whole, superior to the comparative samples in both strength and wear resistance.

Figure 2:
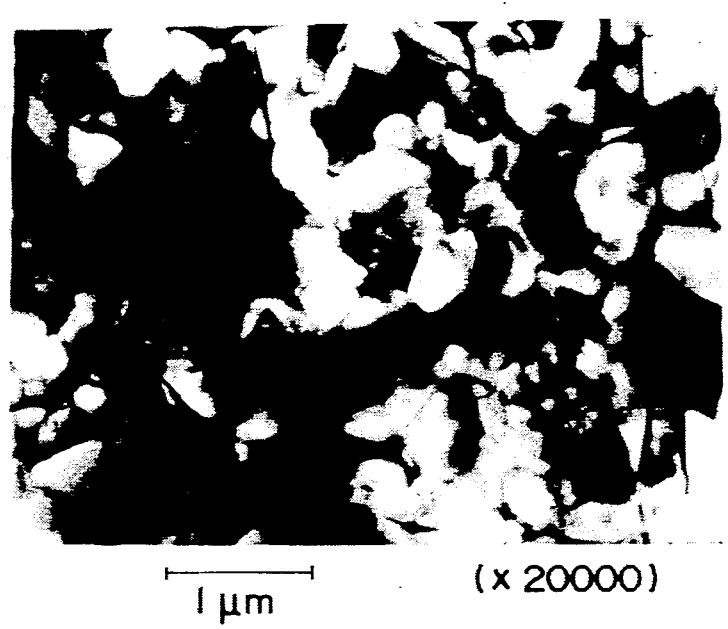
FIGS. 2 and 3 are photographs taken through a transmission electron microscope and showing the crystal structures of the surface and inner portions, respectively, of a sintered body embodying this invention.
Figure 3:
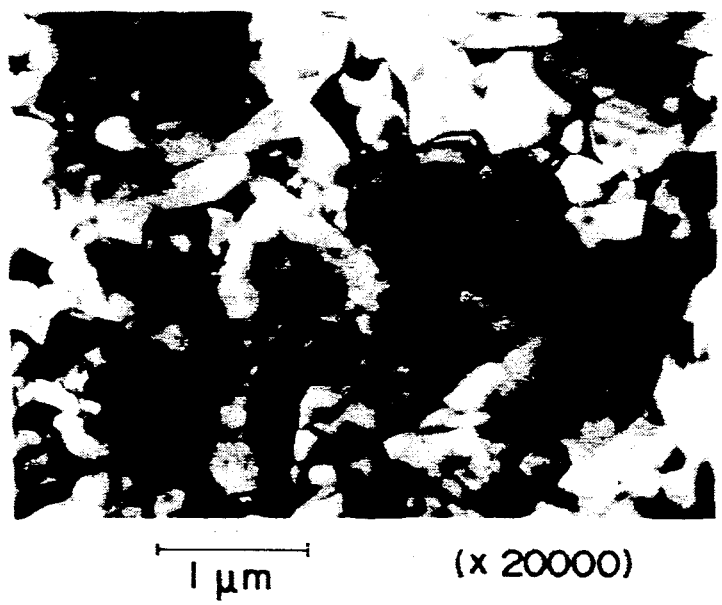

FIGS. 2 and 3 are the photographs taken through a transmission electron microscope and showing at a magnification of 20,000 the crystal structures of the surface and inner portions, respectively, of Sample No. 4 according to this invention. The photographs confirm the presence of more spherical particles of $\alpha'$-Si$_3$N$_4$ in the surface portion than in the inner portion.

EXAMPLE 2

A powder of Si$_3$N$_4$ (the alpha ratio being at least 95% and the amount of metal impurities not exceeding 0.1 weight %) which has an average particle diameter of about 0.5 micron and the oxygen content shown in Table 2 was mixed with Y$_2$O$_3$ powder and AlN powder both having a purity of 99.9% and an average particle diameter of at most 0.5 micron. The mixture was molded and sintered at a temperature of 1800° C. for 2 hours by hot pressing. Thus the sintered bodies of $\alpha'$-silicon nitride and $\beta'$-silicon nitride having the compositions and crystal grains shown in Table 2 were obtained.

Comparative samples (C6 to C9 in Table 2) were prepared in a similar manner except that the amount of SiO$_2$ in the surface of a Si$_3$N$_4$ powder is more than 40% of a total amount of oxygen. For each sample as shown in Table 2, both Y$_2$O$_3$ and AlN in the same amounts were used as sintering agent.

The total amount of oxygen in a powder of Si$_3$N$_4$ and the amount of SiO$_2$ in the surface of a powder of Si$_3$N$_4$ were determined by the process for treating hydrofluoric acid which is described in CAMP-ISIJ, 1 (1988) p.636 or XPS which is reported in J. Materials Science, 22 (1987) p.3717.

TABLE 2

| Sample No. | | Total oxygen content in Si$_3$N$_4$ powder (weight %) | SiO$_2$ in Si$_3$N$_4$ powder (% relative to total oxygen content) | Proportion of $\alpha'$-Si$_3$N$_4$ | Average diameter of crystal grains ($\mu$m) | | | Four-point bending strength (kg/mm$^2$) | |
| --- | --- | --- | --- | --- | --- | --- | --- | --- | --- |
| | | | | | $\alpha'$-Si$_3$N$_4$ | $\beta'$-Si$_3$N$_4$ | | | |
| | | | | | | long diam. | short diam. | room temp. | 1300° C. |
| Invention | 9 | 1.2 | 58 | 0.17 | 0.5 | 1.2 | 0.4 | 130 | 113 |
| | 10 | 1.3 | 54 | 0.18 | 0.5 | 1.3 | 0.5 | 125 | 110 |
| | 11 | 1.3 | 62 | 0.18 | 0.6 | 1.3 | 0.5 | 123 | 110 |
| | 12 | 1.4 | 57 | 0.17 | 0.6 | 1.4 | 0.5 | 120 | 107 |
| | 13 | 1.6 | 56 | 0.18 | 0.6 | 1.5 | 0.6 | 120 | 105 |
| Comparative | C6 | 1.8 | 22 | 0.18 | 1.1 | 3.2 | 1.1 | 95 | 69 |
| | C7 | 2.0 | 20 | 0.17 | 1.3 | 4.1 | 1.2 | 93 | 65 |
| Invention | 14 | 1.3 | 54 | 0.30 | 1.0 | 2.5 | 0.8 | 105 | 98 |
| | 15 | 1.3 | 62 | 0.31 | 0.9 | 2.7 | 0.8 | 105 | 95 |
| | 16 | 1.1 | 55 | 0.30 | 0.9 | 2.4 | 0.9 | 109 | 100 |
| | 17 | 1.0 | 70 | 0.30 | 0.9 | 2.4 | 0.7 | 103 | 96 |
| | 18 | 1.2 | 58 | 0.31 | 1.0 | 2.6 | 0.8 | 107 | 99 |
| Comparative | C8 | 1.9 | 26 | 0.30 | 2.0 | 4.5 | 1.3 | 90 | 67 |
| | C9 | 1.5 | 33 | 0.30 | 1.5 | 3.9 | 1.2 | 87 | 65 |

The crystal body was analyzed by X-ray diffraction for the proportions of $\alpha'$- and $\beta'$-Si$_3$N$_4$ of which it was composed, and an average particle diameter of crystal grains. It was also examined for four-point bending strength at room temperature according to JISR16. The results are shown in Table 2. The proportion of $\alpha'$-Si$_3$N$_4$ was determined by comparing the sum of the two highest peak strength values of $\alpha'$ type of silicon nitride and the sum of the two highest peak strength values of $\beta'$ type of silicon nitride in a chart obtained by the X-ray diffraction of the sintered product. The proportion of $\alpha'$-Si$_3$N$_4$ in Table 2 is a value when the total proportion of $\alpha'$- and $\beta'$-Si$_3$N$_4$ are assumed to be 1.

As is obvious from Table 2, the samples according to this invention were superior to the comparative samples in both average particle diameter of crystal grains and strength.

What is claimed is:

1. A sintered body comprising $\alpha'$-silicon nitride and $\beta'$-silicon nitride, said sintered body having a surface portion and an inner portion, said inner portion having a proportion of $\alpha'$-silicon nitride of from 0.05 to 0.50 and a proportion of $\beta'$-silicon nitride of from 0.50 to 0.95, and said surface portion having a thickness of from 200 to 500 $\mu$m and having a proportion of $\alpha'$-silicon nitride of from 0.05 to 0.2 greater than said proportion of $\alpha'$-silicon nitride in said inner portion, each of said proportions being defined as the ratio of peak strengths revealed by X-ray diffraction.

2. A sintered body as set forth in claim 1, wherein said α'-silicon nitride has the general formula $$M_x(Si, Al)_{12}(O, N)_{16}$$

where M is at least one of the elements Li, Mg, Ca and Y, and $0<x\leq 2$, while said β'-silicon nitride has the general formula $$Si_{6-z}Al_zO_zN_{8-z}$$

where $0<z\leq 4.2$.

3. A sintered body as set forth in claim 2, wherein $0<x\leq 0.3$, and $0<z\leq 1.0$.

4. A sintered body as set forth in claim 1, wherein said surface layer comprises an outermost layer and at least one intermediate layer located between said outermost layer and said inner portion, and said proportion of α'-silicon nitride increases in the order of said inner portion, said intermediate layer and said outermost layer.

5. A sintered body as set forth in claim 1, wherein said proportion of α'-silicon nitride shows a continuous increase from said inner portion to the surface of said surface portion.

6. A sintered body as set forth in claim 1, wherein said α'-silicon nitride is composed of spherical crystal grains having an average diameter not exceeding 2.0 microns, and said β'-silicon nitride is composed of elliptically spherical crystal grains having an average long diameter not exceeding 5.0 microns and an average short diameter not exceeding 1.0 micron.

7. A sintered body as set forth in claim 6, wherein said average diameter does not exceed 1.0 micron, said average long diameter does not exceed 1.0 micron, and said average short diameter does not exceed 0.5 micron.

8. A process for making a sintered body of silicon nitride, comprising the steps of:
preparing a molded body of a first material which can form a sintered body composed of α'-silicon nitride and β'-silicon nitride, said α'-silicon nitride being present in a proportion of from 0.05 to 0.50 and said β'-silicon nitride being present in a proportion of from 0.50 to 0.95, said proportions being defined as the ration of peak strengths revealed by X-ray diffraction;
disposing about said molded body a second material which can form a sintered surface layer composed of α'-silicon nitride and β'-silicon nitride, said sintered surface layer having a thickness of from 200 to 500 μm and containing a proportion of α'-silicon nitride of 0.05 to 0.2 greater than said proportion of α'-silicon nitride in said sintered body; and
sintering said molded body and said second material disposed about said molded body.

9. A process as set forth in claim 8, wherein said material which can form a sintered body composed of α'-silicon nitride and β'-silicon nitride comprises a material which can form α'-silicon nitride when heated at a sintering temperature, and a material which can form β'-silicon nitride when heated, and said material which can form α'-silicon nitride is at least one of α'-silicon nitride itself and a mixture of substances which react together to form α'-silicon nitride when heated, while said material which can form β'-silicon nitride is at least one of β'-silicon nitride itself and a mixture of substances which react together to form β'-silicon nitride when heated.

10. A process as set forth in claim 9, wherein said mixture of substances which react together to form α'-silicon nitride is selected from a mixture of $Si_3N_4$, AlN and $Y_2O_3$, a mixture of $Si_3N_4$, AlN, $Al_2O_3$ and $Y_2O_3$ and a mixture of $Si_3N_4$, $Al_2O_3$, $Y_2O_3$ and AlN.

11. A process as set forth in claim 9, wherein said mixture of substances which react together to form β'-silicon nitride is selected from a mixture of $Si_3N_4$ and $Al_2O_3$, a mixture of $Si_3N_4$, AlN and $Al_2O_3$ and a mixture of $Si_3N_4$, $Al_2O_3$ and $SiO_2$.

12. A process as set forth in claim 8, wherein said material which can form a sintered body composed of α'-silicon nitride and β'-silicon nitride is a mixture of substances which react together to form both α'-silicon nitride and β'-silicon nitride when heated at a sintering temperature.

13. A process as set forth in claim 12, wherein said mixture is at least one of a mixture of $Si_3N_4$, $Y_2O_3$ and AlN, a mixture of $Si_3N_4$, $Y_2O_3$, AlN and $Al_2O_3$ and a mixture of $Si_3N_4$, YN and $Al_2O_3$ having an appropriately controlled composition.

14. A process as set forth in claim 8, wherein said material which can form a sintered body composed of α'-silicon nitride and β'-silicon nitride is selected from a mixture of a powder having a wide particle size distribution and capable of forming α'-silicon nitride when heated, and a powder having a wide particle size distribution and capable of forming β'-silicon nitride when heated, and a mixture of at least two powders of α'-silicon nitride having different compositions and at least two powders of β'-silicon nitride having different compositions.

15. A process as set forth in claim 8, wherein said disposing is carried out by a method selected from causing said material to adhere to the surface of said molded body, and embedding said molded body in said material.

16. A process as set forth in claim 8, wherein at least one of said materials in the first and second steps comprises a powder of silicon nitride and sintering agent, and said powder of silicon nitrides contains oxygen in the total amount of at most 2 weight %, the amount of oxygen existing as silicon oxide in the surface portion thereof being not less than 40% of the total amount of oxygen.

17. A sintered body comprising α'-silicon nitride and β'-silicon nitride, said sintered body having a surface portion and an inner portion, said surface portion consisting essentially of α'-silicon nitride, and said inner portion containing α'-silicon nitride in a proportion of from 0.80 to 0.95 and β'-silicon nitride in a proportion of from 0.05 to 0.2, said proportions being defined as the ration of peak strengths revealed by X-ray diffraction.

* * * * *